No. 706,607. Patented Aug. 12, 1902.
C. P. STEINMETZ.
SYSTEM OF ELECTRICAL DISTRIBUTION.
(Application filed Jan. 2, 1901.)
(No Model.)
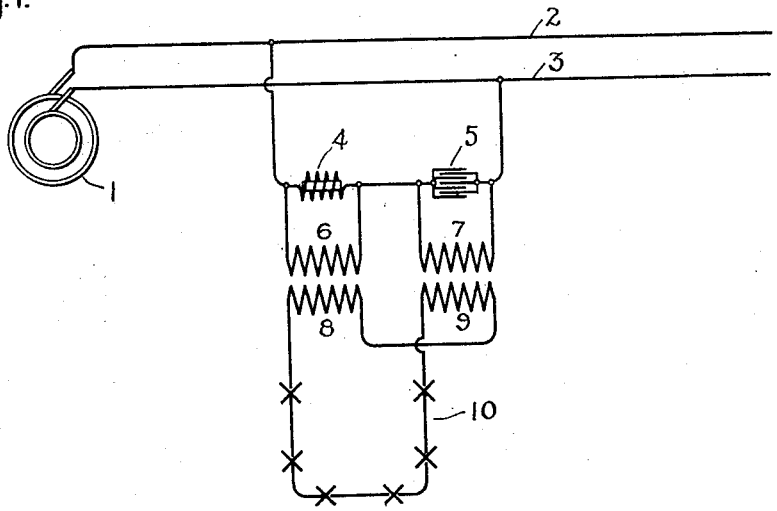
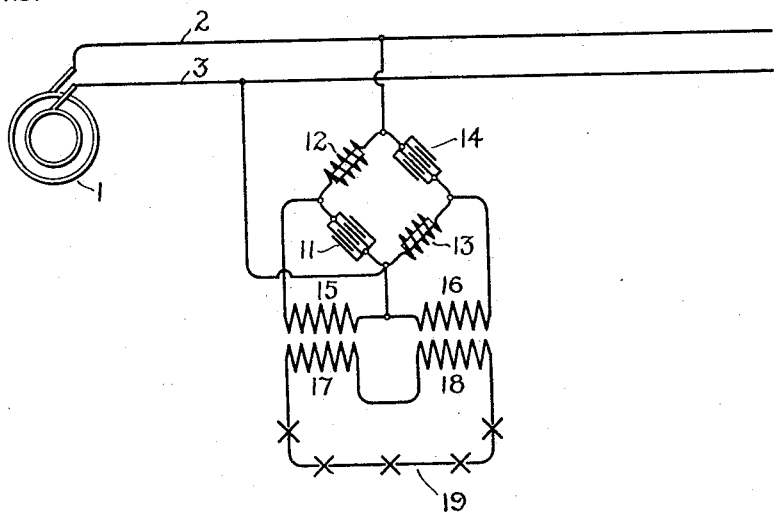
Witnesses.
John Ellis Glenn
Benjamin B. Hull
Inventor.
Charles P. Steinmetz,
by Albert G. Davis
Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 706,607, dated August 12, 1902.

Application filed January 2, 1901. Serial No. 41,812. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (Case No. 2,016,) of which the following is a specification.

My present invention relates to certain improvements in constant-potential constant-current transforming devices in which the desired transformation is effected by the employment of suitable combinations of inductances and condensers. Instead of connecting the constant-current circuit directly to terminals of the condensers and inductances, as has heretofore been done, I make the connection inductively through the agency of suitable transforming devices. This mode of connection allows the attainment of certain important advantages, all of which will be better understood from a consideration of the following detailed description of certain embodiments of my invention, which description is to be taken in connection with the accompanying drawings, in which—

Figure 1 represents one embodiment of my invention, and Fig. 2 a somewhat different embodiment.

In Fig. 1 a source of alternating current is represented conventionally at 1. From this source lead mains 2 3, by which the current is conveyed to any desired translating devices. In connection with supply-mains such as described I make use of a transforming apparatus for changing alternating current of constant potential into alternating current of constant volume, this transforming apparatus consisting in its more essential features of two reactances of opposite sign—such, for example, as the inductance-coil 4 and the condenser 5—these reactances being connected in series with each other across the supply-mains 2 3. The reactances of the inductance-coil 4 and the condenser 5 are so chosen that they exactly equal each other at the normal frequency of the current in the supply-mains. The reactances are thus in resonance relation to each other, the proportions necessary to effect this result being well understood by those skilled in the art. Across the terminals of each of these reactances is connected the primary winding of the transformer, the primary winding 6 of one transformer being connected across the inductance-coil 4 constituting one reactance and the primary 7 of another transformer being connected across the condenser 5 representing the other reactance. These transformers are provided with the secondary windings 8 and 9, which when the apparatus is in operation form the seats of electromotive forces which vary with the load in the constant-current circuit 10, to which these secondary windings are connected in series relation to each other, the connection between the windings being made so that one winding is reversed with respect to the other, as shown. This is done so as to bring the electromotive forces of the windings into conjunction with each other. If the connections between these windings were made without this reversal, the electromotive force of one winding would oppose that of the other. By thus making use of current derived from connections across both the inductance device and the condenser instead of deriving the same from a shunt-circuit about one only of the reactances, as heretofore, I am enabled to largely increase the transforming capacity of the apparatus, this increase amounting to approximately fifty per cent.

Fig. 2 shows a somewhat different arrangement in which supply-mains 2 3 furnish current to two sets of reactances, each set comprising two reactances of opposite sign—as, for example, an inductance-coil and a condenser. The condenser 11 and the inductance-coil 12 are connected in series with each other and across the mains 2 3. In a similar manner the other set of reactances, consisting of the inductance-coil 13 and a condenser 14 in series with each other, are connected across the mains 2 3, the connection being made so that the first set of reactances is reversed with respect to the second. The wattless current of one sign due to one set of reactances is by reason of this reverse connection counterbalanced by wattless current of the opposite sign due to the other set of reactances. The power factor of the mains 2 and 3 is thus unaffected by the pressure of these reactances. Across the condenser 11 is connected a primary winding 15 of a transformer, while in a similar manner the primary winding 16 of another transformer is connected across the adjacent inductance-coil 13. The secondary windings 17 and 18 of these transformers are connected in series with each other and supply current to a constant-current circuit 19, including arc-lamps or other translating devices. The inductive connection between the reactances 11 and 13 and the constant-current circuit 19 is in this case such as to render the apparatus independent of the wave shape of the constant-potential electromotive force of the mains 2 3. This is due to the fact that current in passing from the constant-potential mains to the constant-current circuit is conveyed either directly or inductively through one or the other of the inductance-coils 12 and 13, which operate to suppress electromotive-force waves or harmonics of higher order than the fundamental wave of the impressed electromotive force. The regulation of the constant-current circuit is thus improved, especially at light loads.

In both of the arrangements shown it is obvious that instead of transforming current of constant potential into current of constant volume the reverse transformation may be made without departing from the spirit of my invention—that is to say, current of constant volume may be transformed into current of constant potential by the employment of the same apparatus shown, current then being supplied at constant volume and consumed at constant potential.

Wherever herein I speak of "reactances of opposite sign" I mean to include devices which possess the effect of capacity and inductance, respectively. For the purpose of illustration I have shown a condenser as typifying a device possessing capacity and an inductance-coil as typifying a device possessing inductance; but it will be evident to those skilled in the art that other devices possessing these same qualities may be employed—such, for example, as polarization-cells, transformers with open magnetic circuits, transformers with condensers in their secondaries, &c.

What I claim as new, and desire to secure by Letters Patent of the United States, is—

1. The combination of reactances of opposite sign connected together, a consumption-circuit, and an inductive connection between said consumption-circuit and each of said reactances.

2. The combination of constant-potential mains, reactances of opposite sign connected so as to receive current from said mains, a constant-current circuit, and an inductive connection between said circuit and each of said reactances.

3. The combination of constant-potential mains, reactances of opposite sign connected so as to be traversed by current flowing in said mains, a constant-current circuit, and an inductive connection between said circuit and each of said reactances.

4. The combination of a condenser and an inductance device connected together, two transformers having a winding of one connected across the terminals of the condenser, and a winding of the other connected across the terminals of the inductance device, and a circuit including another winding of each of said transformers.

5. The combination of a condenser and an inductance device connected together, two transformers having a winding of one connected across the terminals of the condenser, and a winding of the other connected across the terminals of the inductance device, and a circuit including in series another winding of each of said transformers.

6. The combination of reactances of opposite sign connected together, transformers having a winding of one connected across the terminals of one of said reactances and a winding of another connected across the terminals of another of said reactances, and a circuit including in series other windings of said transformers.

7. The combination of reactances of opposite sign connected together, a supply-circuit, operative connections between said reactances and said supply-circuit, and means for combining electromotive forces corresponding to those existing between the terminals of the respective reactances, and a consumption-circuit upon which the resultant electromotive force is impressed.

8. The combination of a condenser and an inductance device connected together, two transformers having a winding of one connected across the terminals of the condenser, and a winding of the other connected across the terminals of the inductance device, and a circuit including in series another winding of each of said transformers, the last-mentioned windings being reversely connected with respect to each other.

9. The combination of constant-potential mains, a condenser and an inductance device connected in series across said mains, transformers having a winding of one connected across the terminals of the condenser and a winding of another connected across the terminals of the inductance device, and a constant-current circuit including in series other windings of said transformers.

10. The combination of constant-potential mains, reactances of opposite sign in series across said mains, transformers having a winding of one connected across the terminals of one reactance, and a winding of another across the terminals of another reactance, and a constant-current circuit including in series a winding of each of said transformers.

In witness whereof I have hereunto set my hand this 29th day of December, 1900.

CHARLES P. STEINMETZ.

Witnesses:
BENJAMIN B. HULL,
EDWARD WILLIAMS, Jr.